July 14, 1959  W. J. HYDE  2,894,868
METHODS AND APPARATUS FOR RECLAIMING CABLE SHEATHS
Filed Oct. 7, 1955  4 Sheets-Sheet 1
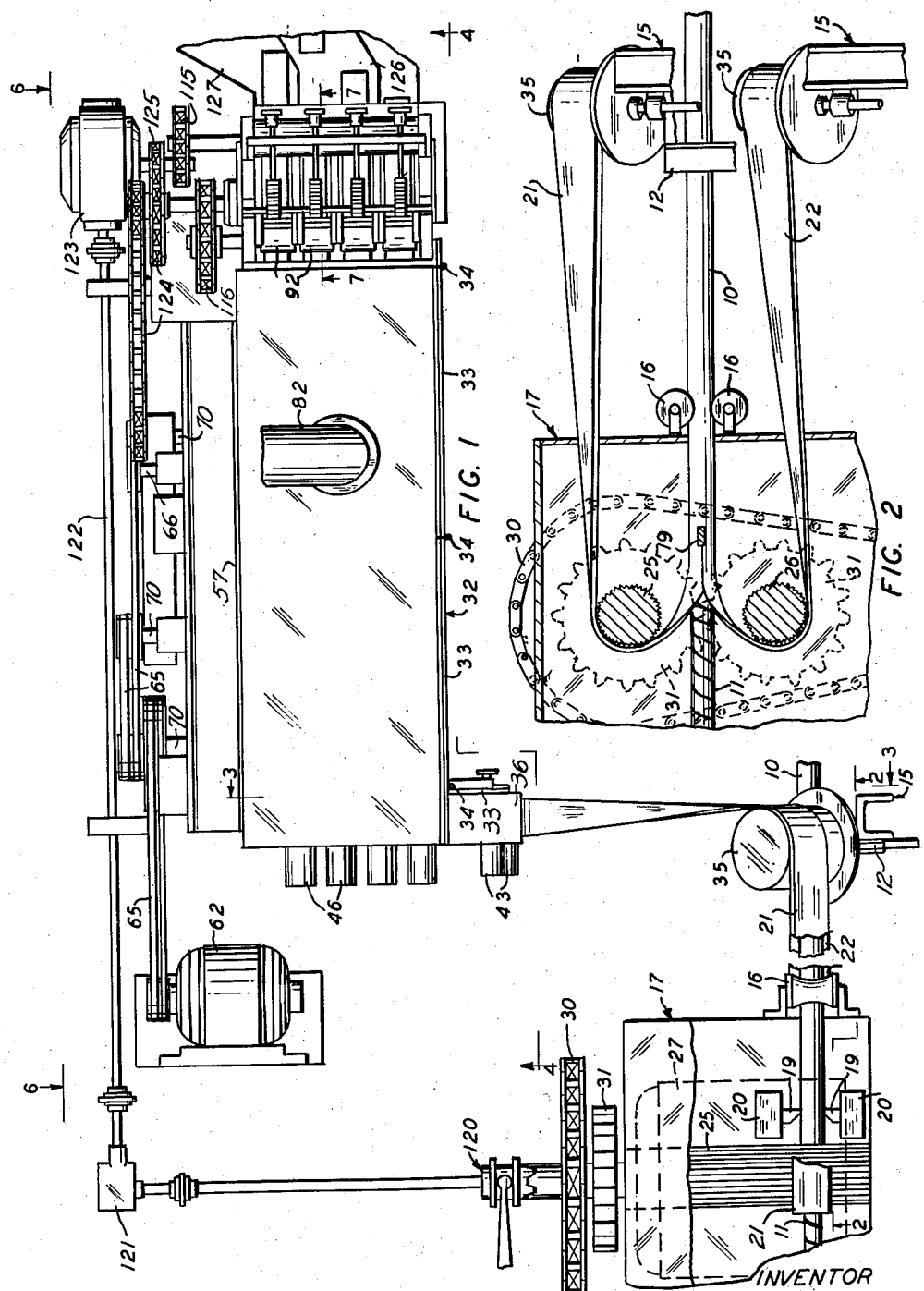
INVENTOR
W. J. HYDE
BY
ATTORNEY July 14, 1959 W. J. HYDE 2,894,868
METHODS AND APPARATUS FOR RECLAIMING CABLE SHEATHS
Filed Oct. 7, 1955 4 Sheets-Sheet 2
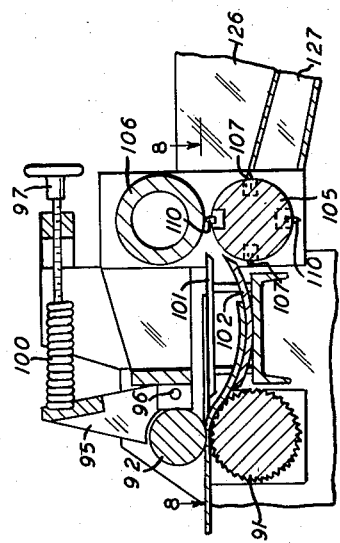
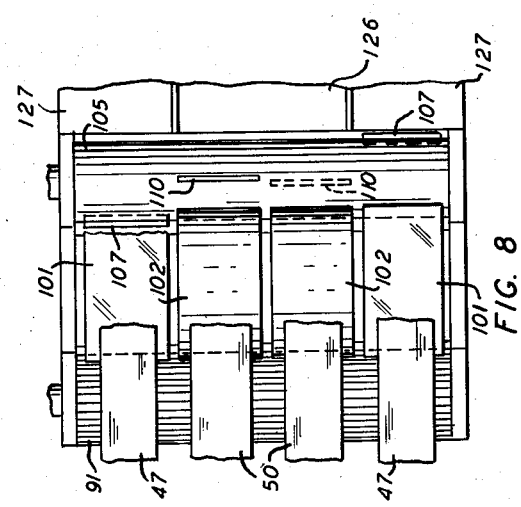
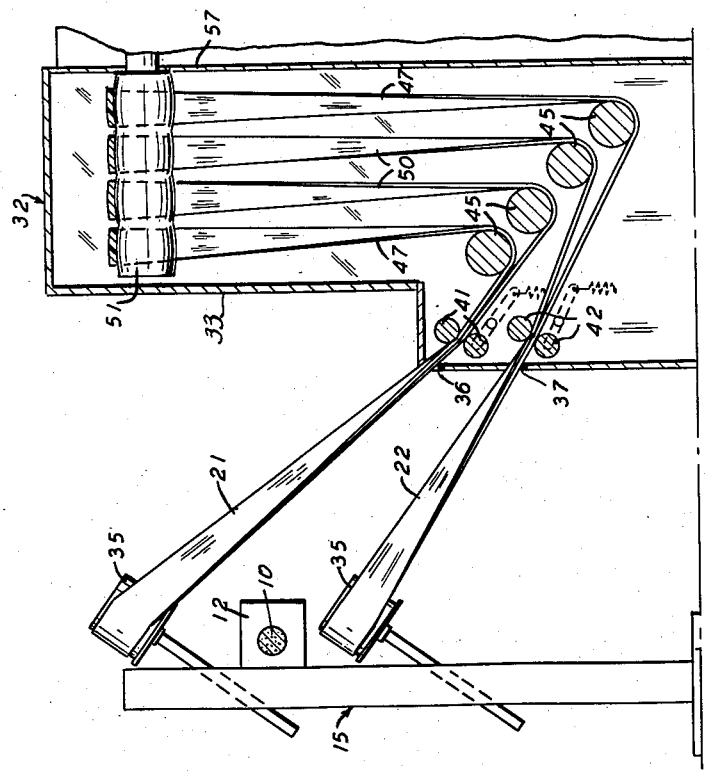
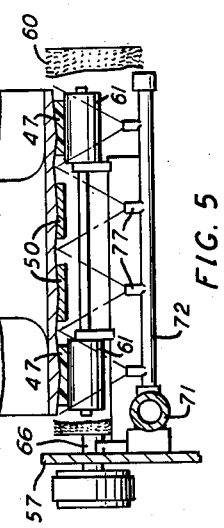
INVENTOR.
W. J. HYDE
BY
ATTORNEY July 14, 1959 W. J. HYDE 2,894,868
METHODS AND APPARATUS FOR RECLAIMING CABLE SHEATHS
Filed Oct. 7, 1955 4 Sheets-Sheet 3

INVENTOR.
W. J. HYDE
BY
ATTORNEY

July 14, 1959 W. J. HYDE 2,894,868
METHODS AND APPARATUS FOR RECLAIMING CABLE SHEATHS
Filed Oct. 7, 1955 4 Sheets-Sheet 4

INVENTOR.
W. J. HYDE
BY
ATTORNEY

United States Patent Office 2,894,868
Patented July 14, 1959

2,894,868

METHODS AND APPARATUS FOR RECLAIMING CABLE SHEATHS

William J. Hyde, Baltimore, Md., assignor to Western Electric Company, Incorporated, New York, N.Y., a corporation of New York Application October 7, 1955, Serial No. 539,067

11 Claims. (Cl. 154—2.21)

This invention relates to methods of and apparatus for reclaiming cable sheaths, and more particularly to methods of and apparatus for reclaiming composite cable sheaths.

One type of cable used in the communication field includes a plurality of conductors forming a core over which a composite sheath has been applied. The composite sheath may comprise a covering of polyethylene with a sheath of lead thereover, or the polyethylene covering may be applied over the lead. In both cases, a layer of a thermoplastic sealer, such as an asphaltic compound, is applied between the inner and outer coverings to prevent water or moisture from travelling along the length of the cable if the outer covering were severed or ruptured at some point on the cable.

Occasionally these cables are manufactured faultily and are unsuitable for use in the communications field. For example, a cable having a sheath that does not have a uniform cross section may be unsuitable for communication purposes. Also, cable that has been damaged in some other manner during its manufacture or in the field may be rendered unsuitable. It is very often desirable from the economic and supply standpoints to reclaim the sheaths from unacceptable cables so that the various materials, including the undamaged core, can be reused.

It is an object of the invention to provide methods of and apparatus for reclaiming cable sheaths.

Another object of the invention is to provide methods of and apparatus for reclaiming composite cable sheaths.

An apparatus for reclaiming cable sheaths illustrating certain features of the invention may include means for slitting the sheath longitudinally of the cable, means for stripping continuously the slitted sheath from the cable, means for cleaning the slitted sheath and means for maintaining the slitted sheath flat during the cleaning thereof.

In one specific apparatus embodying the invention there is provided a pair of spaced cutting blades for slitting longitudinally a composite cable sheath wherein the various coverings making up the sheath have a thermoplastic sealer therebetween. The slitted composite sheath is then stripped from the cable in two parts and is passed through separating rollers. The separating rollers separate the composite sheaths into individual strips and thereby expose all surfaces having the sealer thereon. The individual strips are passed through a cleaning apparatus so that the surfaces having the sealer thereon are exposed alternately to a spray of solvent for dissolving the sealer and brushes for cleaning the surfaces. An overdriven pulling roller is provided for maintaining the individual strips flat as they pass through the cleaning apparatus. After the surfaces are cleaned thoroughly, they are rinsed, and the strips are passed through cutters which cut the strips into pieces of uniform lengths.

Other objects and advantages of the invention will become apparent by reference to the following detailed description of a specific embodiment thereof and the accompanying drawings, in which:

Fig. 1 is a plan view of an apparatus for reclaiming composite cable sheaths embodying certain features of the invention;

Fig. 2 is a vertical, fragmentary section taken along line 2—2 of Fig. 1;

Fig. 3 is a vertical, fragmentary section taken along line 3—3 of Fig. 1;

Fig. 5 is a fragmentary section taken along line 5—5 of Fig. 4;

Fig. 7 is an enlarged, vertical section taken along line 7—7 of Fig. 1, and

Fig. 8 is a horizontal section taken along line 8—8 of Fig. 7.

Figure 4:
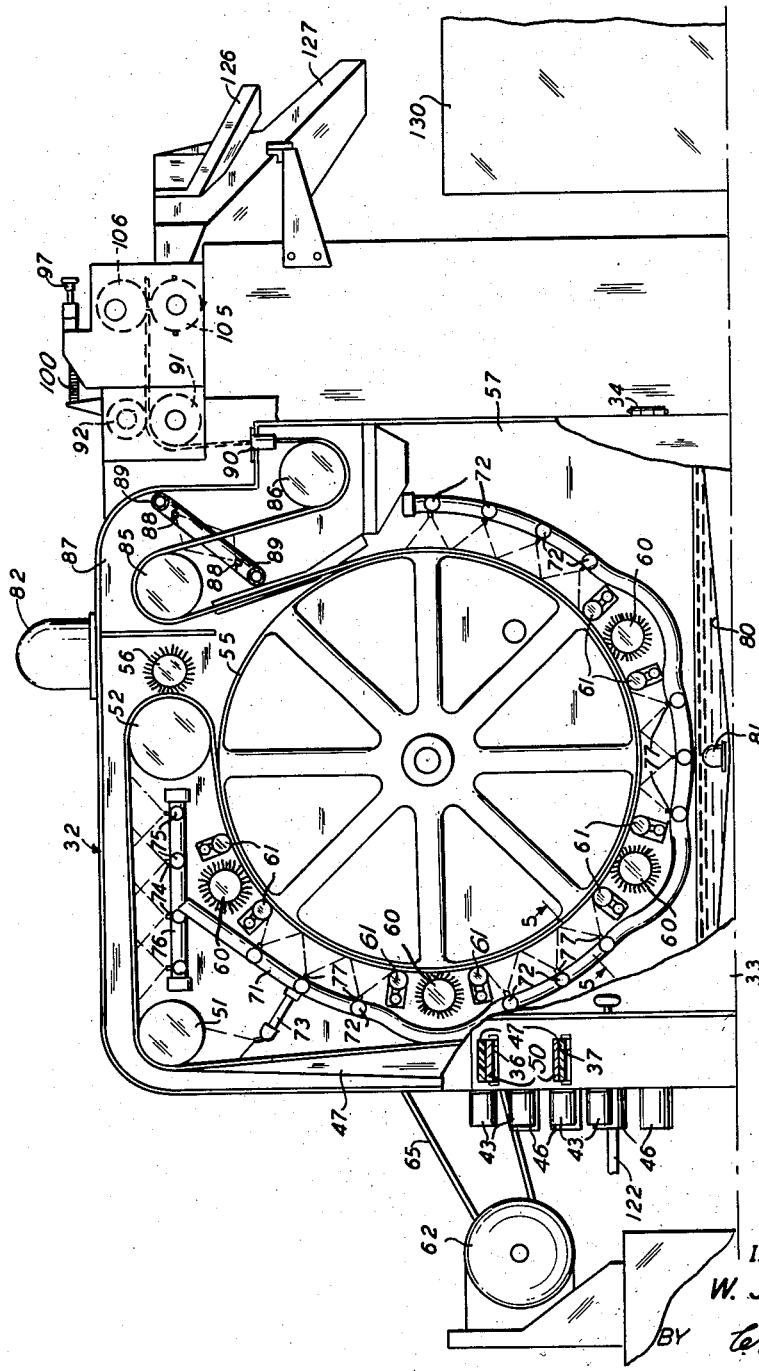
Fig. 4 is a vertical section taken along line 4—4 of Fig. 1.

Referring now to the drawings, and more particularly to Figs. 1 and 2, there is shown a cable 10 having a composite sheath therearound. It will be assumed that in the manufacture of the cable 10, a strip of paper 11 was wound helically around a core consisting of a plurality of conductors (not shown). It will be assumed further that the cable 10 is one in the manufacture of which a covering of polyethylene was extruded over the paper 11, a layer of a thermoplastic sealer, such as an asphaltic compound, was applied over the polyethylene covering, and a sheath of lead was extruded over the thermoplastic sealer.

The cable 10 is directed by suitable means (not shown) through a guide 12 secured to a cable guide and pulley stand, designated generally by the numeral 15. The cable 10 is then passed between a pair of guide rollers 16—16 and into a severing apparatus shown generally at 17. A pair of cutting blades 19—19 are secured upon standards 20—20 within the severing apparatus 17 so that they contact opposite sides of the cable 10 and slit the composite sheet into two longitudinal strips. The blades 19—19 must slit the composite sheath of lead, thermoplastic sealer and polyethylene without cutting the paper strip 11. To insure that the paper strip 11 is not cut by the blades 19—19, the blades are adjusted so that they do not slit the inner covering of polyethylene completely, but slit this covering only partially. The slitted composite sheath is pulled in two composite strips 21 and 22 from the cable 10 by apparatus which will be described more fully hereinafter. It will suffice to say here that when the sheath is pulled from the cable 10, the inner covering of polyethylene is completely severed. The composite strips 21 and 22 are directed over stripping rollers 25 and 26, respectively, which are actuated by a motor 27 through a chain 30 and suitable gears 31—31.

The composite strips 21 and 22 are conveyed to a separating and cleaning apparatus housed within a cabinet, designated generally by the numeral 32. As shown in Fig. 1, a plurality of front panels 33—33 are mounted on hinges 34—34, so that the interior of the cabinet 32 can be exposed completely from the front thereof. Referring to Figs. 3 and 4, the strips 21 and 22 are passed first over crowned pulleys 35—35 mounted at such an angle on the stand 15 that they track the strips 21 and 22 properly into slots 36 and 37, respectively, within the cabinet 32. The composite strips 21 and 22 pass then through two pairs of entrance rollers 41—41 and 42—42, respectively, the lower rollers of which are mounted pivotally in order that they may adjust automatically to varying thicknesses of the composite strips. The entrance rollers 41—41 and 42—42 are mounted in and supported in cantilever fashion by suitable bearings 43—43 (Figs. 1 and 4).

The strips 21 and 22 are passed from the entrance rollers 41—41 and 42—42 around separating rollers 45—45 (Fig. 3), which are journaled in and also supported in cantilever fashion by bearings 46—46 (Figs. 1 and 4). The separating rollers 45—45 are instrumental in pulling the strips 21 and 22 apart so that individual strips 47—47 of polyethylene and strips 50—50 of lead pass over the separating rollers 45—45. When the strips 21 and 22 are pulled apart, all surfaces having the thermoplastic sealer thereon are exposed. From the separating rollers 45—45, the individual strips 47—47 and 50—50 are directed in side-by-side relationship over a multicrowned idler roller 51. The individual strips are given a twist between the separating rollers 45—45 and the idler roller 51 so that the surfaces having the thermoplastic sealer thereon are brought into contact with the periphery of the idler roller 51. From the idler roller 51, the individual strips 47—47 and 50—50 are directed over a multicrowned idler roller 52 and around the periphery of a multicrowned drum 55.

A brush 56 is secured rotatably to a back plate 57 of the cabinet 32 adjacent to the idler roller 52. The brush 56 cleans the sides of the strips 47—47 and 50—50 that have no sealer thereon, but which may have particles of other foreign matter, such as residual fibers of the paper strip 11. A plurality of brushes 60—60 are mounted rotatably to the back plate 57 adjacent to and spaced around the periphery of the drum 55, for cleaning the sides of the strips 47—47 and 50—50 having the sealer thereon. The brushes 56 and 60—60 may be of the type having nylon bristles or any other suitable type. Hold-down rollers 61—61 (Figs. 4 and 5) are secured to the plate 57 and contact the polyethylene strips 47—47 on both sides of each brush 60 for holding the strips 47—47 flat as they pass under the brushes 60—60. Rollers for holding down the lead strips 50—50, similar to rollers 61—61, are not necessary since the strips 50—50 will be flat against the drum 55 when tension is applied thereto, as will be described hereinafter. The brushes 56 and 60—60 are rotated by a motor 62 through driving belts 65—65 (Fig. 6) in a direction opposite to that with which the strips 47—47 and 50—50 are travelling. The belts 65—65 engage suitable pulleys on shafts 66 and 70—70 to which the brushes 56 and 60—60 respectively, are secured.

A supply manifold 71 (Figs. 4 and 5) is secured by suitable means (not shown) to the back plate 57. A plurality of distributing manifolds 72—72 are secured to the manifold 71 and are positioned adjacent to approximately three-fourths of the periphery of the drum 55. A solvent, such as trichlorethylene, is forced under pressure through the supply manifold 71 to the distributing manifolds 72—72. A plurality of nozzles, one of which is shown at 73, are secured to one of the manifolds 72—72 for directing the solvent toward the idler roller 51, which is in direct contact with the surfaces of the strips 47—47 and 50—50 having the sealer thereon. A plurality of nozzles 74—74 are secured to distributing manifolds 75—75, which are connected to a manifold 76. The manifold 76 is connected to the manifold 71 and receives the solvent therefrom. The nozzles 74—74 direct the solvent toward the strips 47—47 and 50—50 as they pass between the idler rollers 51 and 52. A plurality of nozzles 77—77 are formed within the distributing manifolds 72—72 for directing the solvent against the strips 47—47 and 50—50 in the areas between the brushes 60—60.

After the solvent strikes the strips 47—47 and 50—50 in the various areas, the solvent that retains its liquid form falls to the bottom of the cabinet 32 and is collected in a drain 80. The solvent then passes through a conduit 81 to a suitable filtering and recirculating apparatus. Any solvent that is within the cabinet 32 in vapor form is exhausted through a conduit 82, after which it is condensed and recirculated. The exhaustion of the vapor and air from the cabinet also creates a slight vacuum within the cabinet 32. As a result, there will be a flow of air into the cabinet 32, and no solvent vapors can escape therefrom.

As stated above, trichlorethylene may be used to dissolve the thermoplastic sealer that is disposed between the sheath coverings. This solvent is preferable, but other solvents, such as perchlorethylene or carbon tetrachloride, may also be used, if desired.

After the strips 47—47 and 50—50 pass around the periphery of the drum 55, they are directed around a pair of idler rollers 85 and 86 mounted rotatably on the back plate 57 within a segregated compartment 87 of the cabinet 32. The strips 47—47 and 50—50 are rinsed in the compartment 87. The rinsing is effected by spraying a solvent from nozzles 88—88 which are fed by manifolds 89—89. The solvent that is sprayed by the nozzles 88—88 must be one that has not been contaminated so that any particles remaining on the strips 47—47 and 50—50 at this point are removed. As the strips 47—47 and 50—50 pass from the rinsing area, they are passed through a narrow, air-sealing slot 90. The slot 90 and the slots 36 and 37 are the only openings leading from the interior of the cabinet 32 to the atmosphere when the front panels 33—33 are secured in place, and are designed to maintain the partial vacuum within the cabinet 32.

After the strips 47—47 and 50—50 leave the slot 90, they pass between a knurled pulling roller 91 and a plurality of independently-mounted, tension adjusting rollers 92—92 (Fig. 7). The rollers 92—92 are each mounted rotatably on a plate 95 pivoted on a pin 96. The position of each of the upper rollers 92—92 with respect to the knurled pulling roller 91 is adjustable by rotating a bolt 97, which varies the compression of a spring 100. Such varying of position between the rollers 92—92 and the pulling roller 91 is necessary to vary the tensions on the strips 47—47 and 50—50 during the cleaning operation, since these rollers pull the strips through the entire cleaning operation.

After passing between the pulling roller 91 and the tension adjusting rollers 92—92, the outer polyethylene strips 47—47 pass over horizontal platforms 101—101 (Figs. 7 and 8) and the inner lead strips 50—50 pass over curved platforms 102—102. The strips 47—47 and 50—50 then pass between a cutting roller 105 and an anvil roller 106. A plurality of cutting blades 107—107 and 110—110 are secured to the cutting roller 105 (Fig. 8), with the blades 107—107 adjacent to the outer polyethylene strips 47—47 and the blades 110—110 adjacent to the inner lead strips 50—50.

The four cutting blades 107—107 and 110—110 are positioned helically around the periphery of the cutting roller 105, with each blade spaced 90° circumferentially from the adjacent blades and staggered along the cutting roller 105. By staggering the cutting blades, the intermittant load on the cutting roller 105 is more evenly distributed. The distribution of the load on the cutting roller 105 is furthered by positioning the cutting blades 107—107 and 110—110 so that they cut the strips 47—47 and 50—50, respectively, in a lead-polyethylene-lead-polyethylene sequence.

Figure 6:
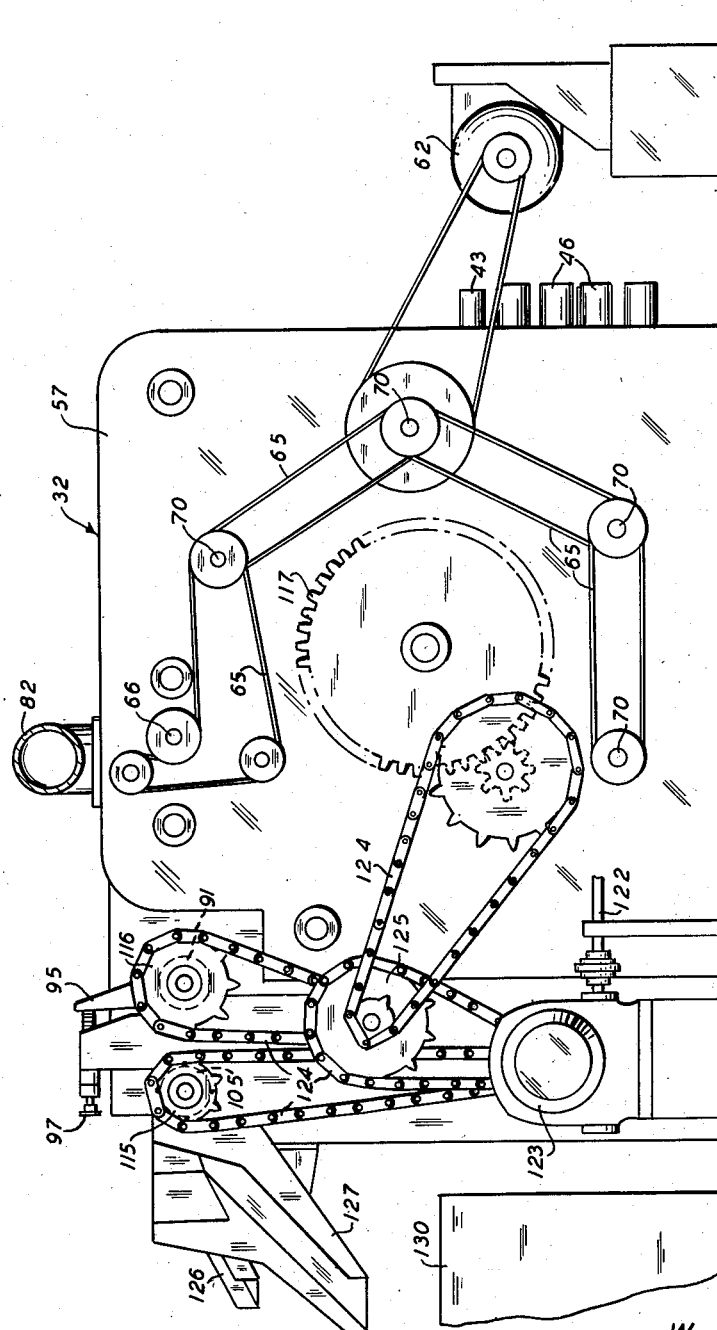
Fig. 6 is an elevation of a portion of the apparatus shown in Fig. 1 looking in the direction of the arrows 6—6.

The cutting roller 105, the pulling roller 91 and the drum 55 are secured to gears 115, 116 and 117, respectively, and are rotated by the motor 27 (Figs. 1 and 6). Such rotation is effected through a clutch 120, a gear box 121, a shaft 122, a gear reducer 123 and a plurality of chains 124—124, which cooperate with the gears 115, 116 and 117. The gear 116, secured to the pulley roller 91, and the gear 117, secured to the drum 55, are driven through a gear 125 which steps down the speed of rotation with respect to that of the cutting roller 105, which is secured to the gear 115. The cutting roller 105 may be designed thereby to rotate about three times as fast as the pulling roller 91 and the drum 55, as will be more fully described hereinafter. It will be noted then that all of the apparatus instrumental in driving the strips 47—47 and 50—50 through the various operations are driven by the motor 27, while the motor 62 drives only the brushes 56 and 60—60.

After the lead strips 50—50 have been cut by the two inner blades 110—110 on the cutting roller 105 into pieces of lead of uniform length, the pieces are discharged into a chute 126. The pieces of the polyethylene strips 47—47 that have been cut by the two outer blades 107—107 are discharged into a chute 127. The chutes 126 and 127 direct the pieces of lead and pieces of polyethylene into different containers, one of which is shown at 130 in Fig. 4.

*Operation*

When the composite sheath on a cable 10 is to be reclaimed, the cable is directed between the guide rollers 16—16 and into the severing apparatus 17. The sheath on the leading end of the cable 10 is slit longitudinally, and the two resulting composite strips 21 and 22 are brought around the serrated rollers 25 and 26, respectively. The composite strips 21 and 22 are then directed into the slots 36 and 37 and through the entrance rollers 41—41 and 42—42, respectively. The lead and the polyethylene strips of each composite strip 21 and 22 are then pulled apart so that all surfaces having the thermoplastic sealer thereon are exposed. After the four strips 47—47 and 50—50 pass through the separating rollers 45—45, the four surfaces having the thermoplastic sealer thereon are twisted in appropriate directions and brought into direct contact with the idler roller 51.

In order to facilitate the "threading up" of the strips 47—47 and 50—50 through the separating and cleaning apparatus within the cabinet 32, canvas straps may be spliced to the strips 47—47 and 50—50 and passed over the idler rollers 51 and 52, the drum 55, the idler rollers 85 and 86 and through the air-sealing slot 90. From there the canvas straps are passed over the pulling roller 91 and between the cutting roller 105 and the anvil roller 106. The anvil roller 106 may be mounted eccentrically so that it can be removed sufficiently from the cutting roller 105 so that the canvas straps are not severed. The brushes 56 and 60—60 may also be mounted eccentrically to facilitate further the threading up of the strips 47—47 and 50—50 and to compensate for wearing of the brushes.

Another way in which the threading up of the strips 47—47 and 50—50 may be facilitated is to retain a previously cleaned strip from a cable sheath within the cabinet 32. In either case, that is, whether the canvas straps or strips from a previously cleaned cable are used to facilitate the threading of the strips to be cleaned, the leading ends of the strips 47—47 and 50—50 of the cable 10 to be reclaimed are spliced to the trailing end of the canvas or previously cleaned strips. Further, with the present invention, the threading up of the cleaning apparatus within the cabinet 32 is greatly facilitated due to the fact that all pulleys, rollers, brushes and the drum within the cabinet are mounted in cantilever fashion to the back plate 57. The canvas straps may be inserted, or access to previously cleaned strips may be had from the front of the cabinet 32 by folding back the hinged front panels 33—33.

Assume that canvas straps are spliced to the leading ends of the strips 47—47 and 50—50, threaded over the idler rollers 51 and 52, the drum 55 and the idler rollers 85 and 96 and passed through the slot 90 to the pulling roller 91. The anvil roller 105 is moved away from the cutting roller 105 at this time so that the canvas straps will not be cut thereby. When the motor 27 and the clutch 120 are energized, the pulling roller 91 and the tensioning rollers 92—92 will pull the canvas straps and the strips 47—47 and 50—50 through the cabinet 32. When the canvas straps are completely through the cabinet 32, the clutch 120 is de-energized to stop rotation of the drum 55, the pulling roller 91 and the cutting roller 105, and the anvil roller 106 is placed in cutting position. After this, the clutch 120 and the brush motor 62 are energized and solvent is directed through the manifolds 71, 76 and 88—88.

The separating rollers 45—45 are instrumental in pulling the composite strips 21 and 22 of polyethylene and lead apart. Also, the surfaces of the individual strips 47—47 and 50—50 that have the thermoplastic sealer thereon are placed in intimate contact with the idler roller 51. Since the sealer will tend to build up on the idler roller 51, the nozzles 73—73 direct the solvent toward the idler roller 51 to prevent initial sticking and to dissolve any sealer which might tend to be deposited thereon. The individual strips 47—47 and 50—50 are then sprayed continuously with solvent from the nozzles 74—74 and 77—77, which are designed to produce solid, square patterns. The brushes 60—60 alternately scrub areas on the surfaces of the strips 47—47 and 50—50 that have the sealer thereon after they have been sprayed by the solvent.

To insure that the strips 47—47 of polyethylene will be held flatly against the drum 55, the hold-down rollers 61—61 are provided. To insure further that all of the strips 47—47 and 50—50 will be flat on the drum 55, the pulling roller 91 is overdriven slightly with respect to the serrated stripping rollers 25 and 26 in the severing apparatus 17. For example, a 3% overdrive of the peripheral speed of the pulling roller 91 with respect to that of the rollers 25 and 26 will result in sufficient tension on the strips 47—47 and 50—50 to cause them to be held firmly against the periphery of the drum 55. Such overdriving of the pulling roller 91 with respect to the stripping rollers 25 and 26 will keep the lead strips 50—50 flat against the drum, but the rollers 61—61 are provided for the polyethylene strips 47—47 because they will tend to return to the semicircular shape that they had before being stripped from the cable 10. Also, a 2% overdrive of the peripheral speed of the drum 55 with respect to the rollers 25 and 26 will prevent the strips from loosening between those points and being diverted from their paths over the various rollers therebetween.

After the strips 47—47 and 50—50 pass from the pulling roller 91, they are directed over the platforms 101 and 102, respectively. The curved platform 102 is provided to direct the strips 50—50 of lead, since the lead strips will tend to maintain a curved shape after passing over the pulling roller 91. Since the polyethylene strips 47—47 will not tend to hold a curved shape after passing over the pulling roller 91, the horizontal platform 101 is provided for them.

Another feature of the present invention is that the linear speed of the cutting blades 107—107 and 110—110 is approximately three times the speed of the strips 47—47 and 50—50. This difference in speed is attained, as described hereinbefore, by stepping down the speed of the pulling roller 91 and drum 55 through the gear 125. By increasing the linear speed of the cutting blades, tension is developed in the strips 47—47 and 50—50 between the pulling roller 91 and the cutting roller 105 as the blades 107—107 and 110—110 start to compress the strips against the anvil roller 106. This tension causes tearing of the strips 47—47 and 50—50 to occur before the blades completely cut through the strips. Therefore, even though the blades 107—107 and 110—110 do not contact the anvil roller 106, pieces of uniform length are completely severed from the strips 47—47 and 50—50. This over-speed feature facilitates adjustment of the cutting blades 107—107 and 110—110, permits use of the unhardened anvil roller 106 and reduces wear on the cutting blades and the anvil roller. Also, an outward force is produced on each piece cut from the strips 47—47 and 50—50 to aid in conveying these pieces into the chutes 126 and 127.

While the above-described apparatus has been described to be used for reclaiming sheaths having two coverings, it is to be understood that it may be readily

What is claimed is:

1. The method of reclaiming composite cable sheaths, which comprises the steps of slitting the composite sheath longitudinally of the cable, stripping the slitted sheath from the cable in composite strips, separating the elements of the stripped composite strips into individual strips, cleaning the individual separated strip surfaces, and maintaining the individual strips flat during the cleaning thereof.

2. The method of reclaiming composite cable sheaths wherein the cable includes a core covered with a plurality of sheaths of different materials with a layer of sealer therebetween, which comprises the steps of slitting such a composite sheath longitudinally, stripping the slitted composite sheath from the core in composite strips, separating the elements of the composite strips stripped from the core into individual strips to expose the sealer thereon, cleaning the sealer from the individual strips, and maintaining the individual strips flat during the cleaning thereof.

3. Apparatus for reclaiming cable sheaths from cables being advanced along the longitudinal axis thereof in an elongated path, which comprises cutting means positioned adjacent the path with at least one cutting edge projecting into said path for slitting the sheath longitudinally of the cable, movable means synchronized with the movement of the advancing cable and in frictional engagement with the slitted sheath for assisting in stripping the slitted sheath from the cable in strips, means synchronized with said stripping means for removing the slitted sheath from the stripping means, means positioned adjacent the path of the stripped, slitted sheath for cleaning the strips of the sheath, means for supporting the strips of the sheath during the cleaning thereof, means for advancing the strips successively from the stripping means, past the means for removing the slitted sheath from the stripping means, through the cleaning means and over the means for supporting the strips of sheath during the cleaning thereof, and means for overdriving the advancing means with respect to the stripping means so that the strips are held intimately against the supporting means during the cleaning thereof.

4. Apparatus for reclaiming composite sheaths from cables being advanced along the longitudinal axis thereof in an elongated path including a core covered with a plurality of sheaths of different materials with thermoplastic compound therebetween, which comprises cutting means adjacent the elongated path with at least one cutting edge projecting into the path for slitting the composite sheath longitudinally, movable means synchronized with the movement of the advancing cable and in frictional engagement with the slitted sheath for assisting in stripping the slitted composite sheath from the core in composite strips, means for separating the elements of the composite strips into individual strips to expose the compound thereon, means for cleaning the compound from the individual strip surfaces, means for pulling the strips successively from the stripping means, and to and through the separating means and the cleaning means, and means for actuating the pulling means faster than the stripping means so that the individual strips are held flat during the cleaning thereof.

5. Apparatus for reclaiming composite sheaths from cables being advanced along the longitudinal axis thereof in an elongated path wherein the sheaths include a plurality of coverings with thermoplastic compound between adjacent coverings, which comprises cutting means adjacent the elongated path with at least one cutting edge projecting into said path for slitting the sheath longitudinally of the cable, movable means synchronized with the movement of the advancing cable and in frictional engagement with the slitted sheath for separating the slitted coverings into individual strips and exposing the surfaces having the compound thereon, a drum, means for maintaining the individual strips flatly against the periphery of the drum, means for cleaning the compound from the surfaces of the strips while the strips are in contact with the periphery of the drum, and means synchronized with said separating means for pulling the strips from the cable, through the separating means, over the periphery of the drum and through the cleaning means.

6. Apparatus for reclaiming composite sheaths from cables being advanced along the longitudinal axis thereof in an elongated path including a core covered with a plurality of sheaths with sealer therebetween, which comprises cutting means adjacent the elongated path for slitting the composite sheath longitudinally, movable means synchronized with the movement of the advancing cable and in frictional engagement with the slitted sheath for assisting in stripping the slitted composite sheath from the core, means for separating the elements of the composite strips into individual strips to expose the sealer thereon, a drum, means for cleaning the surfaces of the individual strips having the sealer thereon while such strips pass over the periphery of the drum, means synchronized with the cable stripping means for pulling the individual strips successively from the stripping means, through the separating means, over the periphery of the drum and through the cleaning means, and means for overdriving the pulling means with respect to the stripping means so that the individual strips are held flatly against the drum periphery during the cleaning thereof.

7. Apparatus for reclaiming composite sheaths from cables being advanced along the longitudinal axis thereof in an elongated path, which comprises cutting means adjacent the path contacting the sheath for slitting the composite sheath longitudinally of the cable, movable means synchronized with the movement of the advancing cable engaging frictionally the slitted composite sheath for assisting in stripping the composite sheath from the cable and separating the composite sheath into individual strips, means synchronized with said stripping means engaging the individual strips for advancing such strips, a drum positioned between the advancing means and the stripping and separating means having a surface for receiving the individual strips being advanced by the strip advancing means, cleaning means adjacent to the drum surface and progressively engaging the entire surface of the individual strips for removing any foreign matter therefrom, the strips advancing means advancing the strips successively from the stripping means, through the separating means, over the periphery of the drum and through the cleaning means, and means for actuating the advancing means and the stripping and separating means in synchronism so that the individual strips are held flatly against the drum surface during the cleaning of such strips.

8. Apparatus for reclaiming composite cable sheaths wherein the sheaths include a plurality of coverings with a layer of a thermoplastic sealing material between adjacent coverings, which comprises means engaging the sheath for slitting the composite sheath longitudinally of the cable, roller means over which the slitted sheath is passed for stripping composite strips of the sheath from the cable, means contacting the stripped composite strips for separating the composite strips into individual strips of the materials of which the coverings are composed and thereby exposing all surfaces of such strips having the sealing material thereon, a rotatable drum, guiding means over which the individual strips are passed for directing the strips over the periphery of the drum in side-by-side relationship with all surfaces having the sealing material thereon exposed outwardly of the periphery of the drum, cleaning means adjacent to the periphery of the drum for removing the sealing material from the surfaces of the individual strips including means for spraying a solvent against such surfaces, roller means gripping the individual strips for advancing such strips successively from the stripping roller means, through the separating means, over the guiding means, around the periphery of the drum and through the cleaning means, and means for driving the gripping roller means faster than the stripping roller means so that the individual strips are held flatly against the periphery of the drum during the cleaning of such strips.

9. Apparatus for reclaiming composite sheaths from cables wherein the sheaths include alternate coverings of a metal and an insulating material with a layer of asphaltic compound disposed between adjacent coverings, which comprises a plurality of cutting blades contacting the sheath at opposite sides of the cable for slitting the sheath longitudinally of the cable, a plurality of stripping rollers for assisting in pulling the slitted sheath from the cable in composite strips, a plurality of separating rollers for assisting in pulling the composite strips into individual strips of the metal and the insulating material to expose all surfaces having the asphaltic compound thereon and over which the individual strips are passed, a rotatable drum, a plurality of guide rollers for directing the individual strips over substantially the whole periphery of the rotatable drum with the surfaces having the asphaltic compound thereon being exposed, a plurality of rotary brushes spaced around the periphery of the drum and designed to engage and clean the surfaces of the individual strips having the compound thereon, nozzle means positioned adjacent to the surfaces for spraying a solvent on such surfaces to assist in the cleaning thereof, a plurality of pulling rollers engaging the individual strips to advance such strips successively from the stripping rollers, through the separating rollers, over the guide rollers, around the periphery of the drum, in contact with the rotary brushes and adjacent to the nozzle means, a cutting roller positioned within the paths of the cleaned, individual strips for severing such strips into pieces of uniform length, a first motor connected to and actuating the stripping rollers, the drum, the pulling rollers and the cutting rollers, a second motor connected to and actuating the rotatable brushes in a direction opposite to that in which the individual strips are travelling, and gear means positioned between the pulling rollers and the first motor for overdriving the pulling rollers with respect to stripping rollers to maintain the individual strips flatly against the periphery of the drum.

10. Apparatus for reclaiming sheaths of cables being advanced along the longitudinal axis thereof in an elongated path which comprises cutting means adjacent the path with at least one cutting edge projecting into said path for slitting the sheath longitudinally of the cable, movable means synchronized with the movement of the advancing cable and in frictional engagement with the slitted sheath for assisting in stripping the slitted sheath from the cable in composite strips, means for separating the elements of the composite strips into individual strips, means synchronized with said stripping means for moving the slitted sheath from the stripping means through the separating means, means positioned adjacent the path of the stripped, slitted, separated sheath for cleaning the individual surfaces thereof, and means for maintaining the stripped, slitted, separated sheath flat as it is moved past said cleaning means.

11. Apparatus for reclaiming sheaths of cables being advanced along the longitudinal axis thereof in an elongated path wherein the cable includes a core covered with a plurality of sheaths of different materials with sealer therebetween which comprises cutting means adjacent the elongated path with at least one cutting edge projecting into said path for slitting the sheath longitudinally of the cable, movable means synchronized with the movement of the advancing cable and in frictional engagement with the slitted, composite sheath for assisting in stripping the slitted, composite sheath from the core in composite strips, means for separating the elements of the composite strips stripped from the core into individual strips to expose the sealer thereon, means for cleaning the sealer from the individual strips, means synchronized with said stripping means and cooperating therewith for moving the slitted sheath from the stripping means through the separating means and past said cleaning means, and means for maintaining the stripped, slitted, separated sheath flat as it moves past said cleaning means.

References Cited in the file of this patent

UNITED STATES PATENTS

| | | |
|---|---|---|
| 415,935 | Boynton | Nov. 26, 1889 |
| 1,349,752 | Erb | Aug. 17, 1920 |
| 1,768,336 | Stevens | June 24, 1930 |
| 1,791,106 | Slugg | Feb. 3, 1931 |
| 1,941,364 | Nunninghoff | Dec. 26, 1933 |
| 1,969,517 | Malloy | Aug. 7, 1934 |
| 2,372,599 | Nachtman | Mar. 27, 1945 |
| 2,429,611 | Churnell | Oct. 28, 1947 |
| 2,435,660 | Tileston | Feb. 10, 1948 |
| 2,624,221 | Schneider | Jan. 6, 1953 |